July 14, 1970   R. E. WARNER   3,520,556
LOAD-STABILIZING TRAILER HITCH
Filed Jan. 17, 1968                2 Sheets-Sheet 1
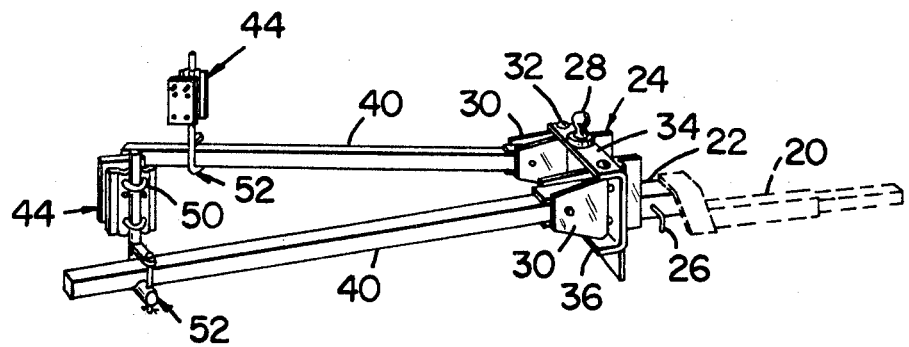
FIG_1
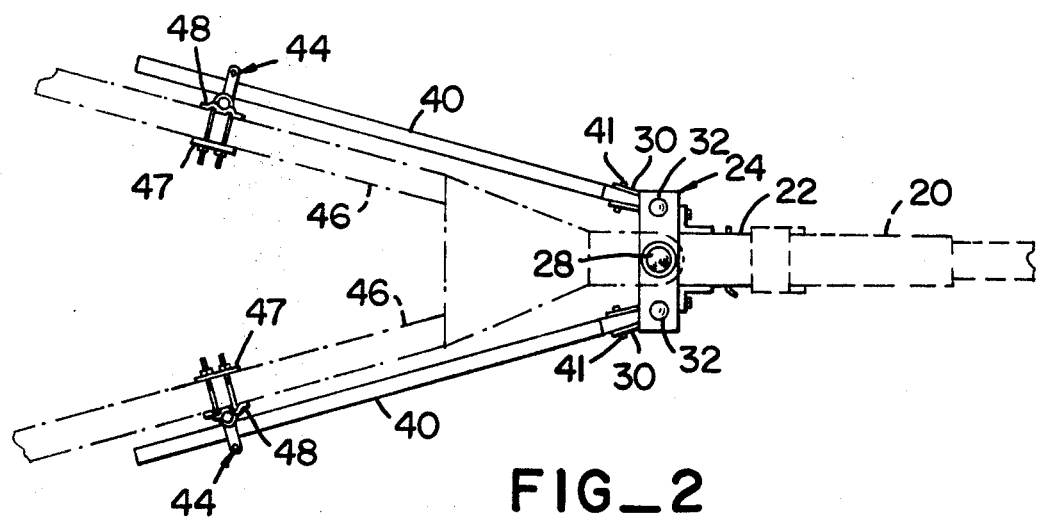
FIG_2
INVENTOR.
RICHARD E. WARNER
BY
Townsend and Townsend
ATTORNEYS

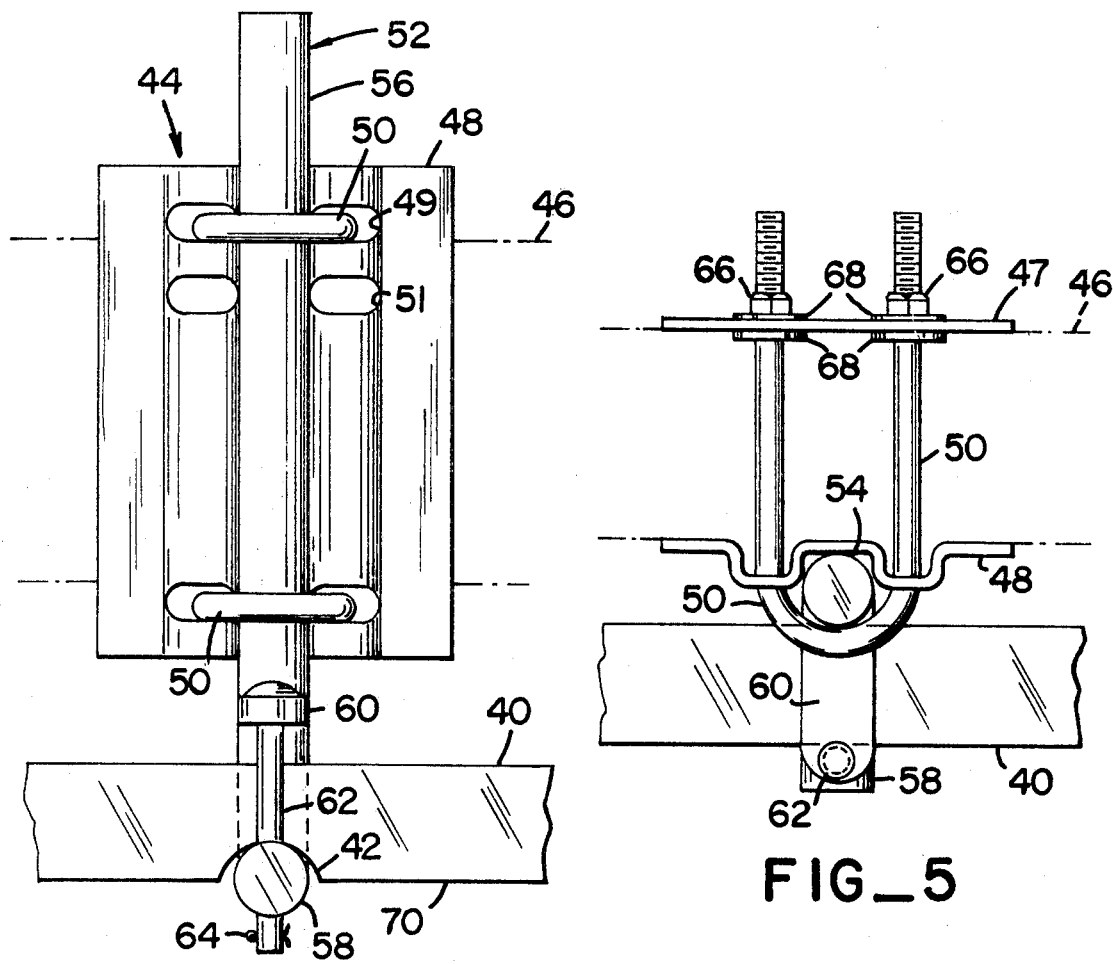
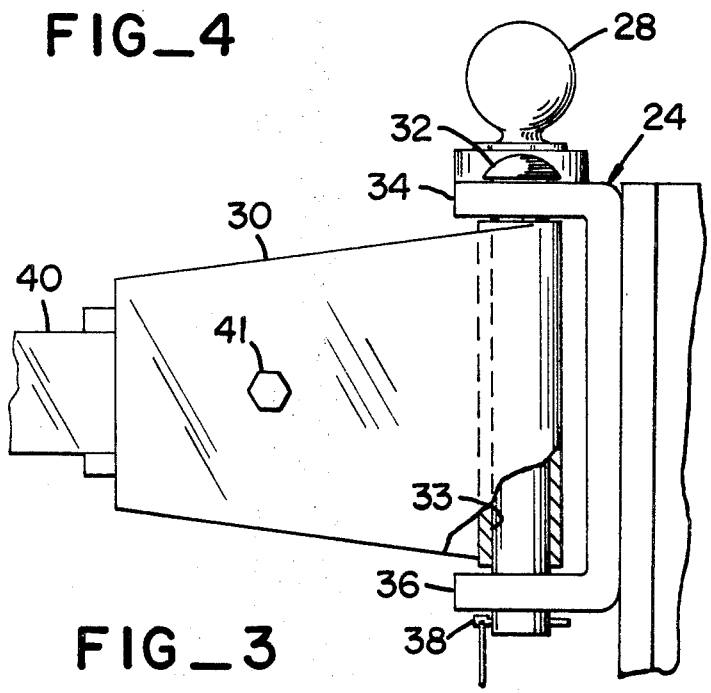

3,520,556
LOAD-STABILIZING TRAILER HITCH
Richard E. Warner, Lodi, Calif., assignor to Valley Tow-Rite, Inc., Lodi, Calif., a corporation of California
Filed Jan. 17, 1968, Ser. No. 698,593
Int. Cl. B60d *1/00;* B62d *53/00*
U.S. Cl. 280—406                                    3 Claims

ABSTRACT OF THE DISCLOSURE

A load-stabilizing trailer hitch of the type having a pair of elongate spring bars pivotally mounted on either side of the ball mount. The spring bars are notched at their free ends for engagement with a J-shaped bar mounted on the tongue frame of the trailer, the J-bar acting with the notch to increase flexure of the spring bars to resist swaying of the trailer. The J-bar permits infinite vertical adjustment of the position of the spring bar to regulate loading of the bar.

---

This invention relates to trailer hitches and, more particularly, to an improved load-stabilizing trailer hitch.

Trailer hitches, that is, coupling devices between automobiles and trailers are well-known. Conventional trailer hitches merely provide a coupling between the automobile and the trailer which permits relative movement of the automobile and the trailer during normal driving and parking. Also well-known are load-leveling trailer hitches which are used to form a bridge across the trailer coupling thus tending to raise the rear of the car and transfer some of the trailer tongue load to the front of the towing vehicle and to the trailer wheels.

Conventional load-leveling trailer hitches do not, however, overcome a substantial difficulty experienced by the driver towing a trailer. This difficulty is the tendency of the trailer to sway or rock, sometimes uncontrollably, during high speed towing and also when being passed by or in passing other vehicles. A particularly severe reaction is caused by the relative motion between a towed trailer and large vehicles such as buses, trucks and commercial tractor-trailer combinations. The suction caused by the differential air pressure on the side of an automobile trailer often causes the trailer to rock and sway so violently that the automobile and its trailer jack knife or the trailer alone is overturned.

The present invention was designed to combine the advantages of a load-leveling trailer hitch as described and claimed in my co-pending application, Ser. No. 701,037 filed on Jan. 17, 1967, with a load-stabilizing structure. The structural features described and claimed therein co-operate with the features of the load-stabilizing trailer hitch of the present design: notched spring bars to provide a camming action and novel spring bar supports which provide an infinite adjustment of the flexure on the spring bars. This new design permits close control of the amount of leveling load and the cam surface complementary to the notches in the spring bars yields the required stabilizing effect.

The load-stabilizing hitch of the present design includes notched spring bars with socket assemblies or mounting heads affixed at one end thereof. Each mounting head has an elongate bore therethrough which provides a bearing surface of substantial area to better accept loading and resist wear. The length of the bore is at least twice the vertical depth of the spring bar. The mounting heads, with the bore in substantially vertical position, are received between the upper and lower flanges of the bracket and elongate, headed pivot pins pass through the flanges and the mounting head bores. The pins are then locked in position by releasable pins which permit removal of the pivot pins and thus removal of the spring bars to permit use of the hitch with only a simple ball mount.

The camming action of the present invention results from the cooperation of the spring bar notches and the novel spring bar supports. The supports permit infinite vertical adjustment of the ends of the spring bars in order to obtain optimum load leveling and stabilizing action from the notched spring bars. There is further cooperation between the notch and its complementary support and the mounting head bore and pivot pin enclosed in the bore. The elongate bore on the mounting head provides a substantial bearing surface to resist the loading and wear from the spring bars. The camming action of the notched bar results in substantially increased loading which is easily carried by the elongate bore and pivot pin. Prior art hitches have been known to fail at the pivots because the design was not capable of absorbing the loading and wear. Elongating the bore and the pivot pin which passes through the bore to at least double the vertical depth of the spring bar yields a construction better able to resist the loading applied. The elongate pivot pin is also better able to resist the shear forces generated from the stabilizing movement of the spring bar than is a shorter pin. In the drawings:

FIG. 1 is a perspective view of the load-stabilizing hitch connected to the draw bar of the towing vehicle;

FIG. 2 is a top view of the hitch;

FIG. 3 is an enlarged fragmentary view of the hitch bracket showing the connection of the spring bar thereto;

FIG. 4 is an enlarged front view of the J-bar mounting bracket with the J-bar mounted therein and assembled with the spring bar; and FIG. 5 is an enlarged top view of the same bracket and J-bar shown in FIG. 4.

Referring now more particularly to the drawings in which similar characters of reference refer to the same parts in each of the several views, the load-stabilizing hitch is shown generally in FIG. 1. The hitch is connected to the motor vehicle through the tow bar 20 which is welded or bolted to the motor vehicle. At the rear of the tow bar is the receiver 22 which is rigidly affixed to the tow bar 20. The receiver is hollow and adapted to receive within it a tongue shaped projection, or plug, welded to the ball mount frame 24. The plug (not separately shown) is secured within the receiver by the pull pin 26 which has a cotter pin or spring clip at one end to retain it in place.

Affixed in the center of the ball mount frame 24 is the ball mount 28 upon which the trailer coupler rests. Adjacent and on either side of the ball mount 28 the bar sockets or mounting heads 30 are pivotally mounted on headed pins 32 which pass through the upper 34 and lower 36 flanges of the ball mount frame 24 and are secured by releasable pins 38 through holes in the ends of the pins 32.

The spring bars 40 are elongated spring steel bars which are received within the bar sockets 30 and secured therein by means of bolts 41. The bar sockets 30 are pivotally joined to the ball mount frame 24 with headed pin 32. Headed pin 32 is inserted through an elongated vertical bore 33 in the bar sockets. It should be noted that the length of bore 33 is at least twice the vertical thickness of spring bar 40. As a result a substantially greater bearing area for pivotal movement on head pin 32 is available than if the spring bar 40 were bored and directly pivoted on pin 32.

The spring bars mounted in their respective bar sockets 30 freely pivot about the headed pins 32. The free ends of the spring bars have notches 42 therein which together with the J-bar supports 44 supply force to the spring bars 40 in order to stabilize the trailer.

The J-bar supports 44 consist of back plate 47 and front plate 48, U-bolts 50 and the J-bar 52. The front plate 48 is shaped with a vertical channel 54 in which the J-bar is retained when the back plate 47 is assembled together with the front plate on one of the frames 46 of the trailer tongue with the front plate facing outward from the tongue.

As its name implies, the J-bar has substantially the shape of a J with an elongate vertical leg 56 and a shorter leg 58 at one end of and perpendicular to the elongate leg 56. In addition, the J-bar 52 is provided with a supplemental leg 60 forming a clevis within which the notched end of the spring bar 40 is enclosed by means of clevis pin 62 retained by a conventional cotter pin 64.

The procedure for hooking up the trailer hitch of the present invention is extremely simple. The ball mount frame 24 with the ball mount 28 fixed is connected to the receiver 22 and secured with pin 26. The spring bars are next mounted by inserting the spring bar socket 30 between the flanges 34 and 36 of the ball mount frame, inserting the headed pins 32 through the flanges and bores 33 of the bar sockets, then locking the pins in place with the releasable pins 38. The trailer tongue is next coupled to the ball mount 28 and the tongue and vehicle raised by means of the trailer jack (not separately shown) with which the tongue is normally provided.

When the trailer tongue and the vehicle are raised a sufficient distance the J-bar support assembly is assembled with the lower leg 58 of the J-bar in the notch of the spring bar and with the front plate 48 on the outward facing portion of the trailer tongue frame member 46. The U-bolts pass through slots 49 in the front plate securing the shank 56 of the J-bar and into complementary slots in the rear plate on the inside face of the trailer tongue frame member. The plates are provided with additional slots 51 spaced apart from the other slots along a vertical axis so that the bolts securing the plates may be as close to the trailer tongue frame member as possible. The U-bolts are then secured by conventional nuts 66 and washers 68. The J-bar lower leg is centered in the center of the notch 42 with the trailer and towing vehicle approximately level. The trailer jack is then lowered to place the spring bars under tension as the trailer tongue is lowered. The load on the spring bars may be varied between minimum and maximum flexure of the bars by vertical movement of the shank of the J-bars along the front plates 48. Thus, if it is desired to increase the load on the spring bars, the shanks of the J-bars may be moved upward relative to the trailer tongue frame. Conversely, lowering the J-bars will decrease the load. As there are no links or notches, the J-bar supports may be vertically adjusted into an infinite number of positions to achieve the exact loading desired. It should be understood that vertical adjustment of the J-bars will be made when the trailer jack is supporting the tongue because the bars will be highly loaded after the trailer jack is raised. The load on the spring bars is transmitted forward through the pins 32 to the ball mount frame 24 and thence to the vehicle frame through the tow bar.

The upward force on the tow bar tends to raise the rear of the vehicle. The reactive force on the J-bar assembly 44 tends to pull down on the trailer tongue thus lowering the front of the trailer. Together, these forces tend to cause the trailer and towing vehicle to assume a level aspect.

In addition, the action of the J-bar and notch when the towing vehicle and trailer are moved tends to resist swaying and rocking of the trailer. For example, when the towing vehicle starts making a right or left turn, the spring bar on the inside of the turn will move backward relative to the J-bar support, thus forcing the notched portion 42 of the spring bar away from the J-bar leg 58 so that the spring bar face 70 rests on the J-bar leg 58. This, of course, results in an increase in the loading on the spring bar on that side of the vehicle. On the opposite side of the vehicle the spring bar is moved forward relative to the J-bar support with the notch on the spring bar on that side moving off the lower leg 58 of its J-bar support thus increasing the loading on that spring bar as well. This increased loading on the spring bars tends to resist the swaying or rocking of the trailer during turning. There is a similar effect to be noticed even in straight line motion of the trailer under the influence of a passing vehicle. Thus, swaying of the trailer will result directly in increased loading on the spring bar and tend to pull the trailer back into the level ride.

An additional result of the use of the notched spring bar and J-bar support is the tendency of the trailer to resume a straight line path through the tendency of the spring bars notches to center into position with the notches engaged with the J-bar legs 58.

While one embodiment of this invention has been shown and described, it will be apparent that other adaptations and modifications can be made without departing from the true spirit and scope of the invention.

I claim:

1. In a load-stabilizing hitch for connecting trailers having a forwardly extending tongue with a towing vehicle, said hitch being of the type in which a spring bar assembly is vertically mounted to a ball carrying bracket, said spring bar assembly comprising: an elongate resilient bar, a mounting head adapted to receive one end of the resilient bar therein, means for locking the resilient bar in the mounting head, said mounting head having an elongate bore therein for releasably receiving a pivot pin, said pivot pin having stop means at one end to maintain its relative position in the bore and a transverse aperture therethrough at the other end, a quick release retaining pin through said aperture to permit removal of said pivot pin from said elongate bore, said elongate bore having a length at least twice the vertical depth of the resilient bar received in the mounting head, said resilient bar having a notch near the free end thereof, and a support mounted on the trailer tongue including cam means for engaging the notched end of the resilient bar to provide increased flexure of the resilient bar when the towing vehicle makes a turn, said support and engaging means vertically adjustable to permit infinitely variable flexure of the resilient bar, said engaging means including a J-shaped clevis bar, the lower leg of which is cylindrical in shape and engages the complementary notch in the spring bar, and wherein the support includes a front plate and a back plate, said front plate having a channel therein for receiving the upper leg of the J-shaped bar.

2. The load-stabilizing hitch of claim 1 and including fastening means coupled with the trailer tongue for locking the vertical member in a selected position so that the resilient bar is flexed at desired amount.

3. The load-stabilizing hitch of claim 2 and wherein the support mounted on the tariler tongue includes means for accommodating differing depths of trailer tongue frame members, said means comprising complementary plates for engaging a tongue frame therebetween, said plates having apertures therein spaced apart along a vertical axis so that fasteners may be inserted through the apertures adjacent the frame member.

References Cited

UNITED STATES PATENTS

| | | | |
|---|---|---|---|
| 2,789,834 | 4/1957 | Chism | 280—406 |
| 3,194,584 | 7/1965 | Reese | 280—406 |
| 3,206,224 | 9/1965 | Bock et al. | 280—406 |
| 3,347,561 | 10/1967 | Hedgepeth | 280—406 |
| 3,403,928 | 10/1968 | Laughlin | 280—406 |
| 3,306,628 | 2/1967 | Haxton | 280—406 |
| 2,898,124 | 8/1959 | Bernard et al. | 280—406 |
| 3,129,957 | 4/1964 | Bernard et al. | 280—406 |

FOREIGN PATENTS 1,446,832   6/1966   France.

LEO FRIAGLIA, Primary Examiner

U.S. Cl. X.R.

280—446